March 15, 1960

M. C. E. BATAILLE 2,928,988

IMPUSE COUNTING AND STORING CIRCUIT

Filed Sept. 3, 1953

3 Sheets-Sheet 1

Inventor
M.C.E. BATAILLE

By Robert Harding Jr.
Attorney

March 15, 1960 M. C. E. BATAILLE 2,928,988

IMPULSE COUNTING AND STORING CIRCUIT

Filed Sept. 3, 1953 3 Sheets-Sheet 2

Inventor
M.C.E.BATAILLE
By Robert Harding Jr.
Attorney

March 15, 1960 M. C. E. BATAILLE 2,928,988
IMPULSE COUNTING AND STORING CIRCUIT
Filed Sept. 3, 1953 3 Sheets-Sheet 3

Inventor
M.C.E. BATAILLE
By Robert Harding Jr.
Attorney

United States Patent Office
2,928,988
Patented Mar. 15, 1960

2,928,988

IMPULSE COUNTING AND STORING CIRCUIT

Maurice Camille Eugène Bataille, Paris, France, assignor to International Standard Electric Corporation, New York, N.Y., a corporation of Delaware Application September 3, 1953, Serial No. 378,205
5 Claims. (Cl. 315—84.5)

The present invention relates to impulse storing circuits which may be used for storing according to the code known under the name of "code $C_n^2$," impulses which are applied thereto one after the other.

When information is available under the form of trains of impulses and it is desired to store this information in order to be able to utilize it afterwards, it is desirable to store the impulses according to the code offering most advantages from the point of view of the number of elements necessary for the storing as well as the ease with which such recorded or stored information may be used afterwards. Particularly when the information appears under the form of successive impulse trains, each train comprising a maximum number of impulses, for example ten, it is often interesting to use the code $C_n^2$, and in the particular case under consideration, the $C_5^2$ code, which permits the recording of ten different items of information.

One of the objects of the present invention is to provide an impulse storing circuit permitting the direct storage of impulses according to the $C_n^2$ code whilst using a reduced number of storing elements.

According to one of the features of the present invention, an impulse counting circuit comprises in combination, a plurality of flip-flop circuits arranged in a chain, each flip-flop circuit comprising two elements, A and B, and each element comprising an input terminal or control terminal and an output terminal; a plurality of electronic gates of the impulse coincidence type, each electronic gate being associated with a flip-flop circuit and comprising three input terminals and an output terminal; means for applying the impulses to be counted simultaneously to one of the input terminals of each one of the electronic gates; means for applying the output potential of the element B of a flip-flop circuit, on the one hand to the input terminal of the electronic gate associated with the following flip-flop circuit in the chain and on the other hand to the input or control terminal of the element A of the previous flip-flop circuit; means for applying the output signals of each electronic gate to the control terminal of the element B of the associated flip-flop circuit; means for applying the output potential of each element A of each flip-flop circuit to an input terminal of the electronic gate associated with the previous flip-flop circuit, the electronic gates being provided in order to give an output signal when the elements which apply their output potentials thereto are in a predetermined state and when a control impulse is applied simultaneously to all the electronic gates.

According to another feature of the invention, such an impulse counting circuit is connected in a ring form in order to permit a continuous operation without necessitating a resetting to zero.

According to another feature of the invention, five flip-flop circuits connected in a ring form are used for registering impulses according to the $C_5^2$ code.

Other objects, features and advantages of the present invention will appear from the reading of the following description of embodiment, the said description being made in conjunction with the annexed drawings, in which.

Figure 5:
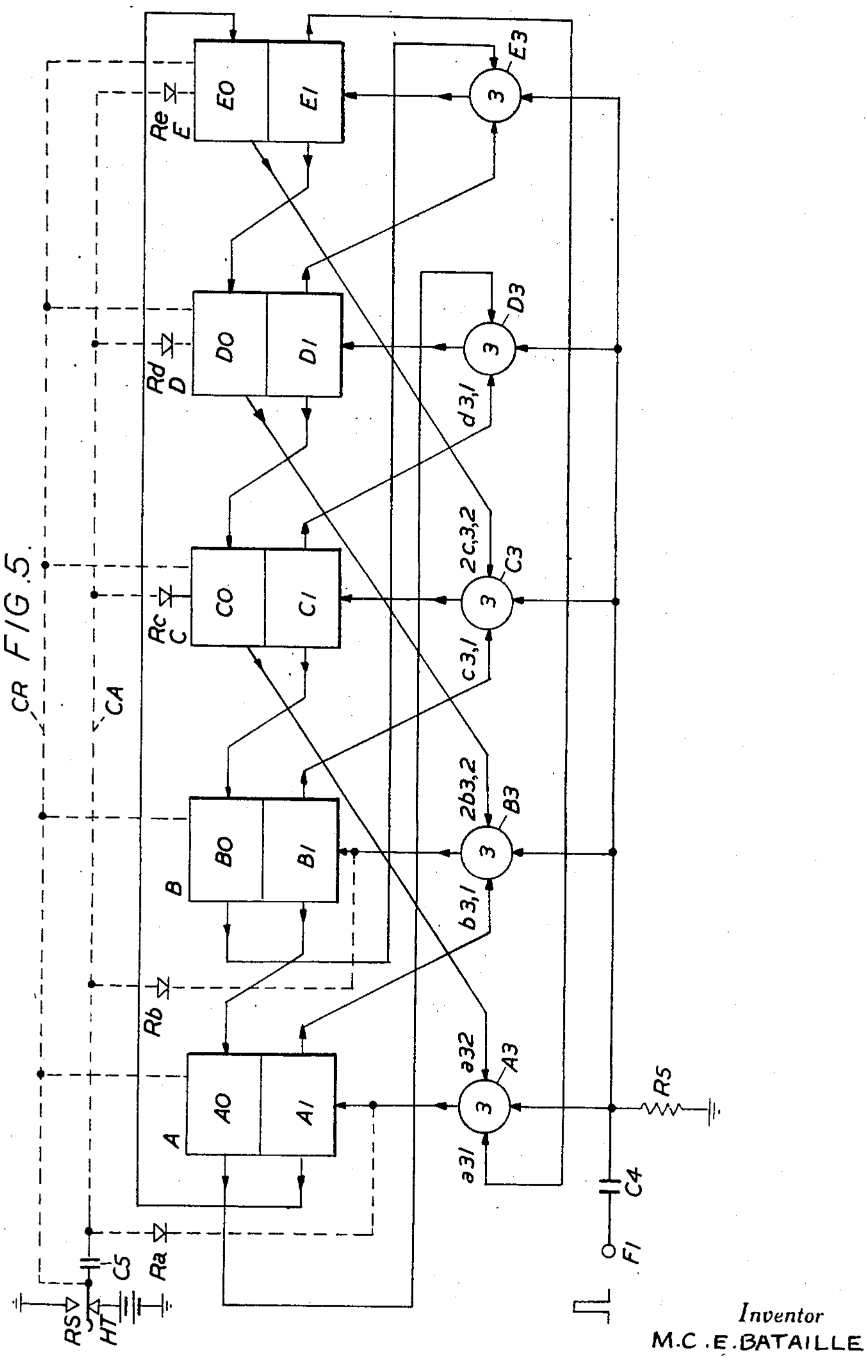
Fig. 5 represents an impulse storing circuit for carrying out the present invention.

In the impulse storing circuit of Fig. 5, use is made of flip-flop circuits and of electronic gates of the impulse coincidence detection type which are well known in the art.

Figures 1, 3, 4:
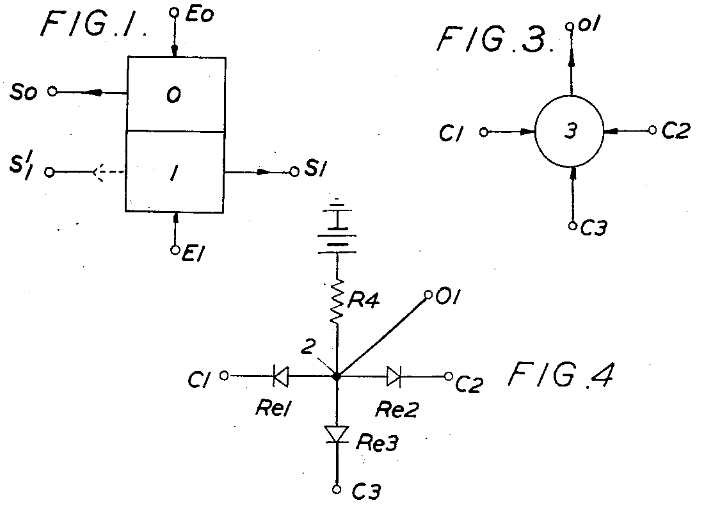
Fig. 1 represents schematically a flip-flop circuit of a known type.
Fig. 3 represents schematically a coincidence electronic gate.
Fig. 4 represents the circuit of a coincidence gate, such as shown schematically in Fig. 2.

There has been shown schematically, in Fig. 1, a flip-flop circuit comprising two elements 0 and 1. Each one of the elements 0 and 1 may take two stable states which are designated as "lit" and "extinguished," using this current terminology for the gas tubes which are often used for constituting the elements 0 and 1. The elements 0 and 1 constituting the flip-flop circuit shown in Fig. 1 are interconnected in such a way that when one of the elements is in one of the two possible states, the other element is in the other state, in such a way that the flip-flop circuit may take two stable states, the passage from one of the states to the other being made under the influence of a control impulse applied in a suitable point of the circuit. Such flip-flop circuits may comprise a plurality of output terminals as this is well known in the art. In the circuit under consideration, each one of the elements comprises an input and an output, thus the element 0 comprises an input E0 and an output S0 and the element 1 comprises an input E1 and an output S1. There has also been shown in dotted line an output S'1 of the element 1, but in the example under consideration this output is connected to the same point of the circuit as the output S1.

Figure 2:
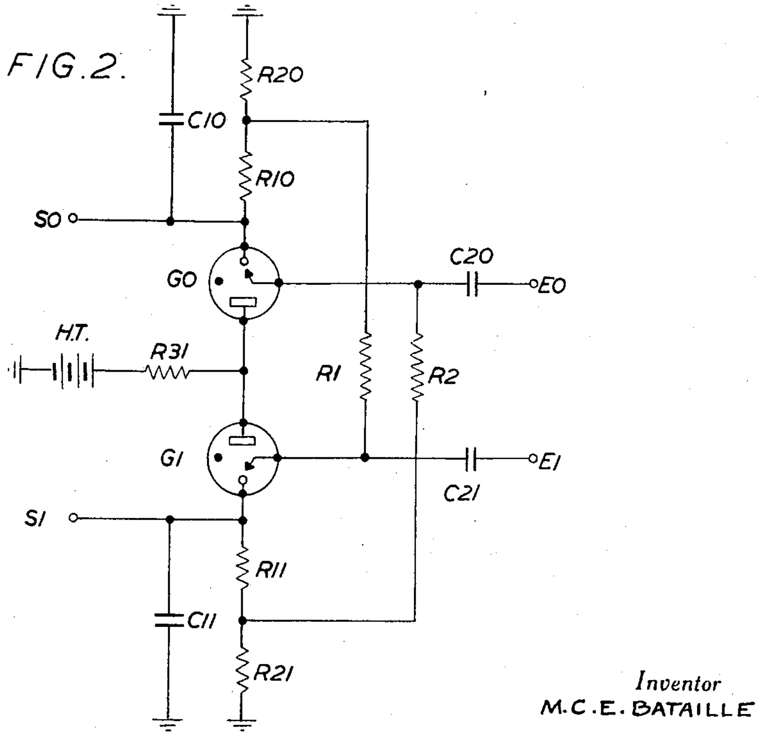
Fig. 2 represents in detail a flip-flop circuit which may be used for carrying into effect the present invention.

There is shown in Fig. 2 an example, well known in the art, of the flip-flop circuit utilizing two gas tubes G0 and G1. The input and the output terminals of this circuit have been designated by the same references as in Fig. 1. The cathode of the tube G0 is connected to the ground by the resistances R10 and R20 connected in parallel with the condenser C10, the mid-point of resistances R10 and R20 being connected to the triggering electrode of tube G1 by the resistance R1. The anodes of the gas tubes G0 and G1 are connected by a common resistance R31 to the positive terminal of a high voltage battery HT. The control impulses are applied to the triggering electrode of the gas tube G0 by means of the terminal E0 and of the condenser C20. The elements R11, R21, R2, C11, C21, E1 and S1 fulfill the same function with respect to the gas tube G1 as the elements R10, R20, R1, C10, C20, E0 and S0, with respect to the tube G0.

The operation of the circuit of Fig. 2 will now be briefly described and it will be assumed that at the start the tube G0 is lit, the tube G1 being consequently extinguished. If there is then applied a control positive impulse to the terminal E1, this causes the lighting of the gas tube G1 which extinguishes the tube G0 by the voltage drop through the common anode resistance R3. There is then obtained an increase of potential at the terminal S1 and a decrease of potential at the output terminal S0. A control positive impulse applied to the terminal E0 would cause the return to the initial condition.

Fig. 3 represents schematically an electronic gate of the potential coincidence detection type. It comprises three inputs C1, C2, C3 and an output terminal O1. The digit 3 inside the circle indicates that it is necessary to have the coincidence between three predetermined potentials applied respectively to the terminals C1, C2 and C3 in order to obtain an output signal at the terminal O1. The direction of the arrows also distinguishes the input from the output terminals.

There is shown in Fig. 4 an embodiment of coincidence gates utilizing elements of asymmetrical conductibility, such as selenium or germanium rectifiers Re1, Re2, Re3. The rectifiers are arranged in order to have an identical electrode connected to the common point 2. This common point is connected on the one hand to the output terminal O1 and on the other hand to the positive terminal of a battery through a resistance R4. It is easy to see that under the circumstances if one of the terminals C1, C2, C3 is brought to a negative potential with respect to the potential of the battery, the potential of point 2 and consequently that of the output terminal O1, will be negative with respect to the potential of the battery, provided resistance R4 is chosen with a suitable value with respect to the direct resistance of the rectifiers used. The output terminal O1 will be brought to a potential very near the potential of the battery only when potentials at least equal to the potential of the battery terminal are simultaneously applied to the terminals C1, C2, and C3. There have been described a particular example of flip-flop circuit and a particular example of coincidence electronic gate, but it is obvious that use can be made of analogous electronic circuits, such as coincidence electronic gates utilizing vacuum tubes or flip-flop circuits using vacuum tubes or transistors.

Fig. 5 represents a ring counting circuit permitting the recording of ten impulses according to the $C_5^2$ code. Use is made for this purpose of five flip-flop circuits A, B, C, D, E, analogous to that shown in Fig. 1, each flip-flop circuit being associated with an electronic gate A3, B3, . . . E3 analogous to that shown in Fig. 3. The input and the output terminals of the different circuit elements have been indicated by means of arrows. The impulses are applied to the terminal F1 in the form of positive impulses and they are applied by means of the condenser C4 and of the resistance R5 simultaneously to all the electronic gates; each electronic gate, for example C3, also receives a control potential from the lower element of the previous flip-flop circuit (B1 in the case under consideration) and a control potential from the upper element of the flip-flop circuit located two rows further away in the counting chain (E0 in the example under consideration). On the other hand, each element of a flip-flop circuit, C1 for example, controls the lighting of the upper element of the previous flip-flop circuit (B0 in the case under consideration). The lighting of the lower elements of the flip-flop circuits is controlled by means of the electronic gate associated therewith. A circuit has also been shown in dotted line for resetting the counting circuit. The working of this reset circuit will be explained later.

The operation of the circuit of Fig. 5 will now be described. The code used is shown in the following table:

| | | | |
|---|---|---|---|
| 0 | 1 1 0 0 0 | 5 | 0 0 1 0 1 |
| 1 | 1 0 1 0 0 | 6 | 0 0 0 1 1 |
| 2 | 0 1 1 0 0 | 7 | 1 0 0 1 0 |
| 3 | 0 1 0 1 0 | 8 | 1 0 0 0 1 |
| 4 | 0 0 1 1 0 | 9 | 0 1 0 0 1 |

In the code used, 0 designates a flip-flop circuit in which the element 0 is conductive and the element 1 is extinguished and the symbol 1 designates a flop-flop circuit in the reverse state or condition. It will be assumed that at the start the circuit is in the position indicating zero, that is to say that the elements A1, B1, C0, D0 and E0 are conductive, the other elements being extinguished.

It is easy to see that under these conditions the electronic gate B3 receives on its control terminals *b*3.1 and *b*3.2 unblocking potentials applied thereto from the elements A1 and D0. Likewise the electronic gate C3 receives on its input terminals *c*3.1 and *c*3.2 control potentials from the elements B1 and E0 which are lit. If there is applied a control impulse to the terminal F1, it is applied simultaneously to all the electronic gates A3, B3, C3, D3 and E3. It is easy to see that only the electronic gates B3 and C3 supply an output impulse in response to the impulse applied to the terminal F1. The output impulse of the gate B3 is applied under the form of a triggering impulse to the element B1 which is already lit and it has therefore no effect. The output impulse of the terminal C3 is applied to the element C1 and causes therefore the change of condition of the flip-flop circuit C. The element C1 becomes conductive and applies an unblocking potential to the terminal *d*3.1 of the electronic gate D3 as well as to the element B0 of the flip-flop circuit B, thus causing the change of condition of this circuit. At the end of these operations, the elements A1, B0, C1, D0 and E0 are lit. Under these conditions, only the electronic gate B3 receives on its input terminals *b*3.1 and *b*3.2 unblocking potentials from the elements A1 and D0 which are lit. When there is applied a second control impulse to the terminal F1, the output impulse of the electronic gate B3 causes the change of condition of the circuit B which causes in its turn the change of condition of circuit A. The operation of the circuit when other control impulses are applied to the terminal F1 is easily deducted from the explanations which have been given in conjunction with the counting of the first two impulses. It is easy to see in particular that when nine impulses have been applied to the input terminals F1, the elements A0, B1, C0, D0 and E1 are lit. The electronic gate A3 receives then on its control terminals *a*3.1 and *a*3.2 unblocking potentials from the elements E1 and C0. A tenth control impulse applied to the terminal F1 will cause, by means of the electronic gate A3, the change of condition of the element A which, in its turn, will cause the lighting of the element E0. The counter is then back in its rest position and it indicates the digit 0. There is shown in CA the resetting to zero conductor and in CR the high voltage supplying conductor of the flip-flop circuits. When the key RS is operated, the high voltage HT is disconnected, thus extinguishing all the lit elements and discharging the condenser C5. When the key RS is back in its normal position, the high voltage is again applied to these flip-flop circuits and a control positive impulse is applied by means of the condenser C5 and of the decoupling rectifiers R*a*, R*b*, R*c*, R*d*, R*e* to the elements A1, B1, C0, D0, E0 which are lit. The circuit is then back in its normal position.

Figure 6:
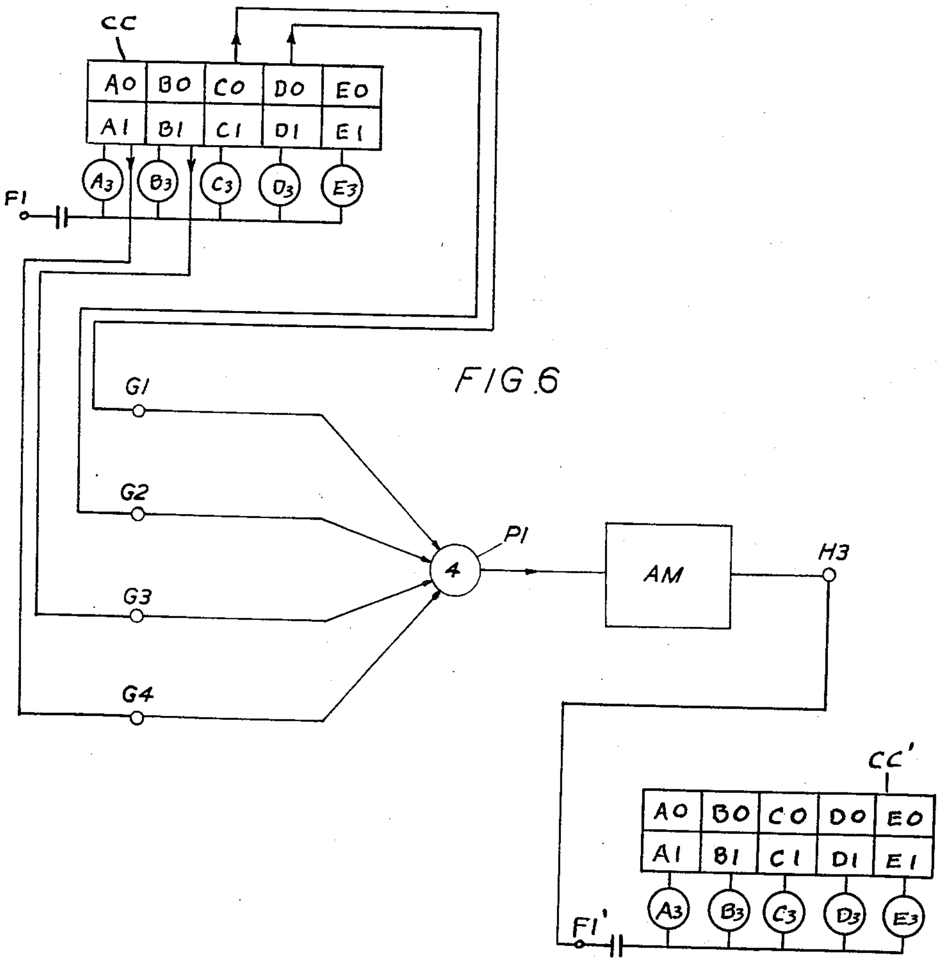
Fig. 6 represents a carrying-over circuit which may be used for associating several storing devices such as that shown in Fig. 5.

Fig. 6 represents two impulse counting and storing circuits connected by a device permitting the carry-over of figures. When the circuit CC which is identical with that shown in Fig. 5 has counted ten impulses it is returned to zero and an impulse must be transmitted to the following similar counting circuit CC, for example the counting circuit for the tens. Use is made for the purpose of an electronic gate P1 which gives an output impulse in response to the application of predetermined potentials to its four input terminals G1, G2, G3, G4. Such an electronic gate may for example be of the same type, as that shown in Fig. 4, with four input terminals instead of three. The four input terminals of the electronic gate P1 may for example be connected to the output terminals of the elements A1, B1, C0, D0 of the circuit CC so that when all these elements are lit, that is to say after the reception of the tenth impulse, there is obtained an impulse at the output terminal H3 of the gate P1 which is amplified by the circuit AM. This impulse may be applied to the terminal F1' of the tens counting circuit CC', also analogous to the circuit shown in Fig. 5.

It is obvious that there could be associated in the same manner any number of counting circuits. Likewise, it would be possible to provide ring counting chains comprising any number of elements and permitting the recording of impulses according to the $C_m^2$ code, *m* being any number.

While the principles of the invention have been described above in connection with a specific embodiment and particular modification thereof, it is to be clearly understood that this description is made only by way of example and not as a limitation on the scope of the invention.

What is claimed is:

1. An electrical counting and storing circuit adapted to count a succession of pulses and to store them according to the $C_n^2$ code where each number is represented by a combination of 2 elements and *n* equals the total number of elements in the code, which comprises *n* flip-flop circuits interconnected in ring formation where "*n*" is at least four, each capable of being in either of two conditions of stability, *n* coincidence gate circuits connected respectively to said flip-flop circuits, each gate circuit having at least three inputs and adapted when operated to cause its associated flip-flop circuit to assume a first condition of stability if it is not already in that condition, a source of pulses to be counted and stored, said source being connected to the first input of all of said gate circuits, each of said gate circuits having a second of its inputs coupled to the preceding flip-flop circuit in said ring and having a third of its inputs coupled to the second succeeding flip-flop circuit in said ring, said couplings being such that a given gate circuit is operable when a pulse is received at its first input from said source while the preceding flip-flop circuit is in its first condition of stablity and while the second succeeding flip-flop circuit is in its second condition of stability, and means for causing each flip-flop circuit to assume its second condition of stabilty, if it is not already in that condition, when the next succeeding flip-flop circuit assumes its first condition of stability.

2. On electrical counting and storing circuit, as defined in claim 1, in which each flip-flop circuit comprises two gas discharge tubes each having an anode, a cathode and a control electrode, a common circuit for the anodes of said tubes, a resistor in said circuit having such a value that only one of said tubes can be operated at a time, circuit means connecting the control electrode of each tube with the cathode of the other, said flip-flop circuit being in its first condition of stability when a particular one of said tubes is discharging, the cathode of said particular one of said tubes being connected to the control electrode of the other of said tubes in the next preceding flip-flop circuit and to the next succeeding gate circuit, and the cathode of the other of said tubes being connected to the second preceding gate circuit.

3. An electrical counting and storing circuit, as defined in claim 2, in which each gate circuit comprises a source of potential, a resistor, a terminal, means for connecting said terminal to said source through said resistor, three branch input circuits connected to said terminal, a rectifier in each branch input circuit so poled as to permit current to flow therethrough from said source, one of said branch input circuits being connected to the source of pulses to be counted, a second branch input circuit being connected to the cathode of the particular tube in the next preceding flip-flop circuit, and the third branch input circuit being connected to the cathode of the other tube in the second succeeding flip-flop circuit, and said terminal being connected to the control electrode of the particular tube in the flip-flop circuit with which said gate circuit is associated.

4. An electrical counting and storing circuit, as defined in claim 1, in which each gate circuit comprises a source of potential, a resistor, a terminal, means for connecting said terminal to said source through said resistor, three branch input circuits connected to said terminal, a rectifier in each branch circuit so poled as to permit current to flow therethrough from said source, one of said branch input circuits being connected to the source of pulses to be counted, a second branch input circuit being connected to the next preceding flip-flop circuit, and the third branch input circuit being connected to the second succeeding flip-flop circuit, and said terminal being connected to the flip-flop circuit associated with said gate circuit.

5. An electrical counting and storing circuit, as defined in claim 4, in which there are a plurality of groups of flip-flop circuits, each group interconnected in a ring, and further comprising a gate circuit between said two groups of flip-flop circuits, said gate circuit comprising four coincidence input circuits, and means for connecting said four input circuits to the first four flip-flop circuits in the first group.

References Cited in the file of this patent

UNITED STATES PATENTS

| | | |
|---|---|---|
| 2,534,856 | Craft | Dec. 19, 1950 |
| 2,626,751 | Mullarkey | Jan. 27, 1953 |
| 2,630,550 | Geohegan | Mar. 3, 1953 |
| 2,651,006 | Mederos | Sept. 1, 1953 |